(12) United States Patent
Nelson et al.

(10) Patent No.: US 12,486,815 B2
(45) Date of Patent: Dec. 2, 2025

(54) SYSTEMS AND METHODS FOR FORECASTING AFTERTREATMENT TEMPERATURES OVER A HORIZON

(71) Applicant: Cummins Inc., Columbus, IN (US)

(72) Inventors: Thomas R. Nelson, Greenwood, IN (US); Jeffrey Diwakar Abraham, Columbus, IN (US); Siddharth Raj Gupta, Madison, WI (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/747,323

(22) Filed: Jun. 18, 2024

(65) Prior Publication Data

US 2024/0337225 A1  Oct. 10, 2024

Related U.S. Application Data

(63) Continuation of application No. 18/232,038, filed on Aug. 9, 2023, now Pat. No. 12,037,955.

(Continued)

(51) Int. Cl.
*F02D 41/02* (2006.01)
*F01N 3/10* (2006.01)
(Continued)

(52) U.S. Cl.
CPC ......... *F02D 41/0235* (2013.01); *F01N 3/106* (2013.01); *F01N 3/2066* (2013.01);
(Continued)

(58) Field of Classification Search
CPC combination set(s) only.
See application file for complete search history.

(56) References Cited

U.S. PATENT DOCUMENTS 8,392,091 B2  3/2013  Hebbale et al.
8,818,659 B2  8/2014  Sujan et al.
(Continued)

FOREIGN PATENT DOCUMENTS

EP   1 837 500 B    10/2010
JP   2009-293409 A  12/2009
(Continued)

OTHER PUBLICATIONS

EPO Extended European Search Report issued in corresponding European Patent Application No. 23190511.8, dated Oct. 6, 2023, 7 pages.

(Continued)

*Primary Examiner* — Binh Q Tran
(74) *Attorney, Agent, or Firm* — Foley & Lardner LLP (57) ABSTRACT

A system includes a processing circuit having a memory coupled to one or more processors, the memory storing instructions therein that, when executed by the one or more processors, cause the one or more processors to: receive an estimated exhaust temperature; generate, based on the estimated exhaust temperature, a forecasted exhaust temperature; modify the forecasted exhaust temperature based on a downpipe model to generate a first temperature profile corresponding to a first component of an exhaust aftertreatment system; and generate, based on the first temperature profile, a second temperature profile corresponding to a second component of the exhaust aftertreatment system.

20 Claims, 4 Drawing Sheets

Related U.S. Application Data (60) Provisional application No. 63/397,297, filed on Aug. 11, 2022.

(51) Int. Cl.
*F01N 3/20* (2006.01)
*F01N 9/00* (2006.01)
*F01N 11/00* (2006.01)
*F02D 41/14* (2006.01)

(52) U.S. Cl.
CPC ............ *F01N 11/005* (2013.01); *F01N 9/005* (2013.01); *F01N 9/007* (2013.01); *F01N 11/002* (2013.01); *F01N 2900/04* (2013.01); *F01N 2900/0406* (2013.01); *F01N 2900/0412* (2013.01); *F01N 2900/0421* (2013.01); *F01N 2900/0422* (2013.01); *F01N 2900/1404* (2013.01); *F01N 2900/1626* (2013.01); *F02D 2041/1411* (2013.01); *F02D 2041/1412* (2013.01); *F02D 2041/1433* (2013.01); *F02D 2041/1437* (2013.01); *F02D 41/1446* (2013.01); *F02D 41/1447* (2013.01); *F02D 2200/0802* (2013.01); *F02D 2200/702* (2013.01)

(56) References Cited

U.S. PATENT DOCUMENTS

| | | |
|---|---|---|
| 9,567,890 B2 | 2/2017 | Schmitt et al. |
| 10,302,034 B2 | 5/2019 | Kidd et al. |
| 2010/0050607 A1 | 3/2010 | He et al. |
| 2010/0235141 A1 | 9/2010 | Wang et al. |
| 2014/0032189 A1 | 1/2014 | Hehle et al. |
| 2014/0052353 A1 | 2/2014 | Sujan et al. |
| 2016/0169073 A1 | 6/2016 | Chanzy et al. |
| 2017/0248061 A1* | 8/2017 | Martin .................. F02D 41/222 |
| 2018/0016962 A1 | 1/2018 | Ardanese et al. |
| 2018/0181090 A1 | 6/2018 | Shimada et al. |
| 2019/0107068 A1* | 4/2019 | Nose .................... F02D 41/1446 |
| 2019/0292970 A1* | 9/2019 | Ikedo ...................... F01N 3/101 |
| 2020/0040785 A1* | 2/2020 | Choi ...................... F01N 3/035 |
| 2020/0063626 A1* | 2/2020 | Dudar ..................... F01N 11/00 |
| 2021/0108589 A1* | 4/2021 | Hashimoto ............ G01K 7/427 |
| 2021/0301700 A1 | 9/2021 | Brahma |
| 2021/0332768 A1* | 10/2021 | Damitz ............... F02D 41/1401 |
| 2022/0316377 A1* | 10/2022 | Norris ................... F01N 3/2066 |

FOREIGN PATENT DOCUMENTS

| | | | |
|---|---|---|---|
| WO | WO-2017/023766 A1 | 2/2017 | |
| WO | WO-2018/102306 A1 | 6/2018 | |

OTHER PUBLICATIONS

Notice of Allowance on U.S. Appl. No. 18/232,038 DTD Mar. 18, 2024.

Office Action for corresponding EP Patent Application No. 23190511.8, issued on Sep. 16, 2024, 5 pages.

* cited by examiner

SYSTEMS AND METHODS FOR FORECASTING AFTERTREATMENT TEMPERATURES OVER A HORIZON

CROSS-REFERENCE TO RELATED APPLICATIONS

This application is a Continuation of U.S. patent application Ser. No. 18/232,038, filed Aug. 9, 2023, which claims the benefit of and priority to U.S. Provisional Application No. 63/397,297, filed Aug. 11, 2022, all of which are incorporated herein by reference in their entireties and for all purposes.

TECHNICAL FIELD

The present disclosure relates to exhaust aftertreatment systems for vehicles. More particularly, the present disclosure relates to systems and methods for forecasting aftertreatment temperatures over a horizon, such as a time horizon.

BACKGROUND

Many engines are coupled to exhaust aftertreatment systems that reduce harmful exhaust gas emissions (e.g., nitrous oxides (NOx), sulfur oxides, particulate matter, etc.). One or more components of the aftertreatment system may operate within a predetermined temperature range. For example, a catalyst may convert harmful exhaust gas emissions more effectively within a predetermined temperature range. A temperature of the exhaust gas may change as the exhaust gas flows through the aftertreatment system. When the exhaust gas temperature changes, the temperature of the components of the aftertreatment system may change as a result thereby affecting the ability of the aftertreatment system to operate as intended.

SUMMARY

One embodiment relates to a system. The system includes a processing circuit comprising a memory coupled to one or more processors, the memory storing instructions therein that, when executed by the one or more processors, cause the one or more processors to perform operations. The operations include receiving engine operational data. The engine operational data indicative of at least one operating condition regarding an engine. The operations also include determining, based on the engine operational data, an estimated exhaust temperature. The operations also include generating, based on the estimated exhaust temperature and a predefined finite time horizon, a forecasted exhaust temperature. The operations also include modifying the forecasted exhaust temperature based on a downpipe model to generate a first inlet temperature profile corresponding to a first component of an exhaust aftertreatment system. The operations also include generating, based on the first inlet temperature profile, a second inlet temperature profile corresponding to a second component of the exhaust aftertreatment system. The second component downstream of the first component.

In some embodiments, the memory includes a flash storage, a random-access memory (RAM) and a multi-level cache. The memory stores model data generated by the downpipe model.

In some embodiments, the operations also include determining, based on the engine operational data, that a first portion of the model data satisfies a predefined relevance standard; determining that the first portion of the model data that satisfies the predefined relevance standard is inaccessible by the one or more processors; and causing the memory to move the first portion of the model data to a lower memory level.

In some embodiments, the operations also include determining that the first portion of the model data is accessible by the one or more processors based on the first portion of the model data being stored in the RAM or in the multi-level cache.

In some embodiments, the system includes one or more engine actuators structured to control at least one of an engine idle speed. The estimated exhaust temperature is based on a position of the one or more engine actuators. The estimated exhaust temperature is an instantaneous temperature of an exhaust gas.

In some embodiments, the operations include receiving at least one of: information indicative of a future road condition or an indication that the future road condition is not known; responsive to receiving the information indicative of the future road condition, determine that a future input signal regarding an engine input is known, and determine the forecasted exhaust temperature based on a first model; and responsive to receiving the indication that the further road condition is not known, determine that the future input signal regarding the engine input is not known, and determine the forecasted exhaust temperature based on a second model different than the first model.

In some embodiments, the system also includes a downpipe. The downpipe fluidly couples the engine to the exhaust aftertreatment system. In some embodiments, the operations include determining a model for an exhaust gas temperature at a point in the downpipe; and determining a change in exhaust temperature between an outlet of the engine and an inlet of the exhaust aftertreatment system based on the model. Modifying the forecasted exhaust temperature is based on the change in exhaust temperature.

In some embodiments, the system also includes a diesel oxidation catalyst and a selective catalytic reduction catalyst, positioned downstream of the diesel oxidation catalyst. The first inlet temperature profile corresponds to the diesel oxidation catalyst. The second inlet temperature profile corresponds to the selective catalytic reduction catalyst.

In some embodiments, the operations also include generating a model of a heat transfer of the exhaust aftertreatment system based on the first inlet temperature profile. The second inlet temperature profile is based on the model of the heat transfer of the exhaust aftertreatment system.

Another embodiment relates to a method. The method includes receiving engine operational data indicative of at least one engine operating condition regarding operation of an engine; determining, based on the engine operational data, an estimated exhaust temperature emitted from the engine; generating, based on the estimated exhaust temperature and a finite time horizon, a forecasted exhaust temperature; generating a first inlet temperature profile corresponding to a first aftertreatment system component of an exhaust aftertreatment system based on the forecasted exhaust temperature; and generating, based on the first inlet temperature profile, a second inlet temperature profile corresponding to a second aftertreatment system component that is downstream of the first aftertreatment system component.

In some embodiments, the forecasted exhaust temperature is generated for the duration of the finite time horizon. In some embodiments, the first aftertreatment system component is a diesel oxidation catalyst (DOC). In some embodiments, the second aftertreatment system component is a selective catalytic reduction (SCR) system.

In some embodiments, the method includes receiving at least one of information indicative of a future road condition or an indication that the future road condition is not known; responsive to receiving the information indicative of the future road condition, determine that a future input signal regarding an engine input is known, and determine the forecasted exhaust temperature based on a first model; and responsive to receiving the indication that the further road condition is not known, determine that the future input signal regarding the engine input is not known, and determine the forecasted exhaust temperature based on a second model different than the first model.

In some embodiments, the method includes determining a model for an exhaust gas temperature at a point in a downpipe that fluidly couples the engine to the exhaust aftertreatment system; and determining a change in exhaust temperature between an outlet of the engine and an inlet of the exhaust aftertreatment system based on the model; wherein modifying the forecasted exhaust temperature is based on the change in exhaust temperature.

In some embodiments, the method includes storing, by a memory of a controller, model data; determining, based on the engine operational data, that a first portion of the model data satisfies a predefined relevance standard; determining that the first portion of the model data that satisfies the predefined relevance standard is inaccessible by a processor of the controller; and moving the first portion of the model data to a lower memory level of the memory of the controller, wherein the memory comprises a flash storage, a random access memory (RAM) and a multi-level cache.

Still another embodiment relates to a non-transitory computer-readable medium storing instructions that, when executed by at least one processor of a controller, cause the controller to perform operations. The operations include receiving engine operational data comprising a first engine operating condition; determining that a relevant portion of model data of a model is accessible by a processor of the controller via a memory comprising a flash storage, a random access memory (RAM) and a multi-level cache based on the relevant portion of the model data being stored in the RAM or in the multi-level cache; determining that the relevant portion of the model data is not accessible by the processor based on determining that the relevant portion of the model data is stored in the flash storage; moving the relevant portion of the model data to a lower memory level; and generating at least one of an estimated temperature value or a forecasted temperature value based on the model and using the relevant portion of the model data.

In some embodiments, the operations also include determining a first relevance score for a first portion of the model data based on comparing the first portion of the model data with the first engine operating condition; and determining that the first portion of the model data is the relevant portion of the model data based on the first relevance score satisfying a relevance standard. In some embodiments, the operations also include determining a second relevance score for a second portion of the model data based on comparing the second portion of the model data with the first engine operating condition; and determining that the second portion of the model data is an irrelevant portion of the model data based on the second relevance score satisfying the relevance standard. In some embodiments, the operations also include causing the memory to move the irrelevant portion of the model data to a higher memory level.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, methods, apparatuses, and systems for forecasting aftertreatment temperatures over a horizon and, particularly, a time horizon. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As utilized herein, the terms "forecasting," "predicting," and like terms are used to refer to determining a future value based on data (e.g., sensor data, historical sensor data, real-time sensor data, etc.). In some embodiments, forecasting the future value may be performed using one or more models (e.g., statistical models, artificial intelligence models, machine learning models, etc.). For example, forecasting a temperature value for a component (e.g., a SCR) of an exhaust aftertreatment system may include using data, such as historical sensor data and/or real-time sensor data, with a model to determine a future temperature of the component.

As utilized herein, the terms "estimating" and like terms are used to mean determining a current value based on data (e.g., sensor data, historical sensor data, real-time sensor data, etc.). In some embodiments, the estimated value may be a determined value regarding a current condition (e.g., a current temperature value, etc.). The determined value may be determined using one or more models (e.g., statistical models, machine learning models, artificial intelligence models, etc.). For example, estimating a temperature value for a component of an exhaust aftertreatment system may include inputting historical data and/or real-time sensor data into a model to determine a current temperature of the component. In some embodiments, the estimated value may be a measured value regarding a current condition (e.g., a current temperature value, etc.). The measured value may be measured by a sensor that measures the current condition at a particular location (e.g., a temperature sensor that measures a current temperature value at a particular location).

As utilized herein, the terms "temperature profile" and like terms are used to mean a set of time-temperature data associated with the measurement and/or estimation of temperatures. For example, a temperature profile may include one or more temperature value of a component (e.g., an engine component, an aftertreatment system component, etc.) or a fluid (e.g., exhaust gas, etc.) during a predetermined time period. Accordingly, a temperature profile may include a set of temperature values that each correspond to a time value. In another example, a temperature profile may include a change in temperature value over a predetermined time period (e.g., measured in ° C. per second, OF per second, etc.).

Referring to the Figures generally, the various embodiments disclosed herein relate to systems, apparatuses, and methods for estimating and/or forecasting temperature values for an aftertreatment system or components thereof over a time horizon. An aftertreatment system may include one or more sensors, such as temperature sensors, to measure the exhaust gas temperature values in real-time or near real-time (e.g., every second, every millisecond, every minute, etc.). A controller (e.g., an engine control module (ECM), engine control unit (ECU), other electronic control unit, etc.) for a vehicle includes at least one processor and at least one memory storing instructions that, when executed by the processor, cause the controller to perform various operations. The operations include estimating and/or forecasting temperature values at different points or positions (e.g., locations) in the aftertreatment system, such as between an engine outlet and aftertreatment outlet, over a predetermined time horizon. The estimated and/or forecasted temperature values enable the controller to provide predictive aftertreatment controls solutions including, but not limited to, diesel exhaust fluid (DEF) dosing controls, soot management, and predictive maintenance.

The estimated and/or forecasted temperature values may include a temperature value of an exhaust gas. In some embodiments, the temperature value of the exhaust gas may be at a location downstream of an engine of the vehicle, such as at an engine outlet or within a downpipe that fluidly couples the engine to an aftertreatment system. In some embodiments, the temperature value of the exhaust gas may be at a location within the aftertreatment system, such as at an aftertreatment system inlet, an aftertreatment system outlet, at an inlet of an aftertreatment system component, at an outlet of an aftertreatment system component, etc. The estimated and/or forecasted temperature values may additionally and/or alternatively include a temperature value for an aftertreatment system component (e.g., a diesel particulate filter).

The systems and methods described herein provide a technical solution to a technical problem of estimating and/or forecasting aftertreatment temperature values in dynamic and ever-changing environments, such as aftertreatment systems. More specifically, the technical problem includes the problem of data storage and memory allocation for a system that estimates and/or forecasts aftertreatment temperature values. The systems and methods described herein may advantageously reduce the amount of processing power required to generate estimated and/or forecasted temperature values. For example, one or more models (e.g., statistical models, machine learning models, artificial intelligence, etc.) may include large amounts of data including historical data, which may be configured as look up tables that include historical temperature values that correspond to a vehicle operational parameter (e.g., an engine load, an engine block temperature, a vehicle speed, an engine actuator position, etc.). Increasing the amount of data may improve the accuracy of the model(s). However, the increased amount of data also increases the complexity of the model(s) and increases the amount of memory used to store the data for the model(s). The systems and methods described herein advantageously dynamically move the data among different memory ranks (e.g., among cache levels), a random-access memory (RAM), and a non-volatile memory device (e.g., flash memory). More specifically, the systems and methods herein may dynamically transfer one or more portions of the stored data based on a vehicle operating parameter. For example, if an engine of the vehicle is operating at a first engine condition (e.g., first engine load, a first engine actuator position, etc.), the system may recognize the first condition as being a trigger condition and automatically transfer data that corresponds to the first engine load or the first position of the first engine actuator to a memory device that is more readily accessible by a processor of the controller. In some embodiments, the controller may determine the first engine condition based on a previously generated command signal for at least a first engine actuator to move to a first position. In some embodiments, the controller may move the data corresponding with the first engine condition (e.g., the first engine load, the first actuator position, etc.) from flash memory to RAM, from RAM to cache, and/or from a high-level cache to a low-level cache (e.g., from "L2" cache to "L1" cache). Thus, the data may be moved among the different memory allocations in the system thereby advantageously reducing the load on the system.

Figure 1:
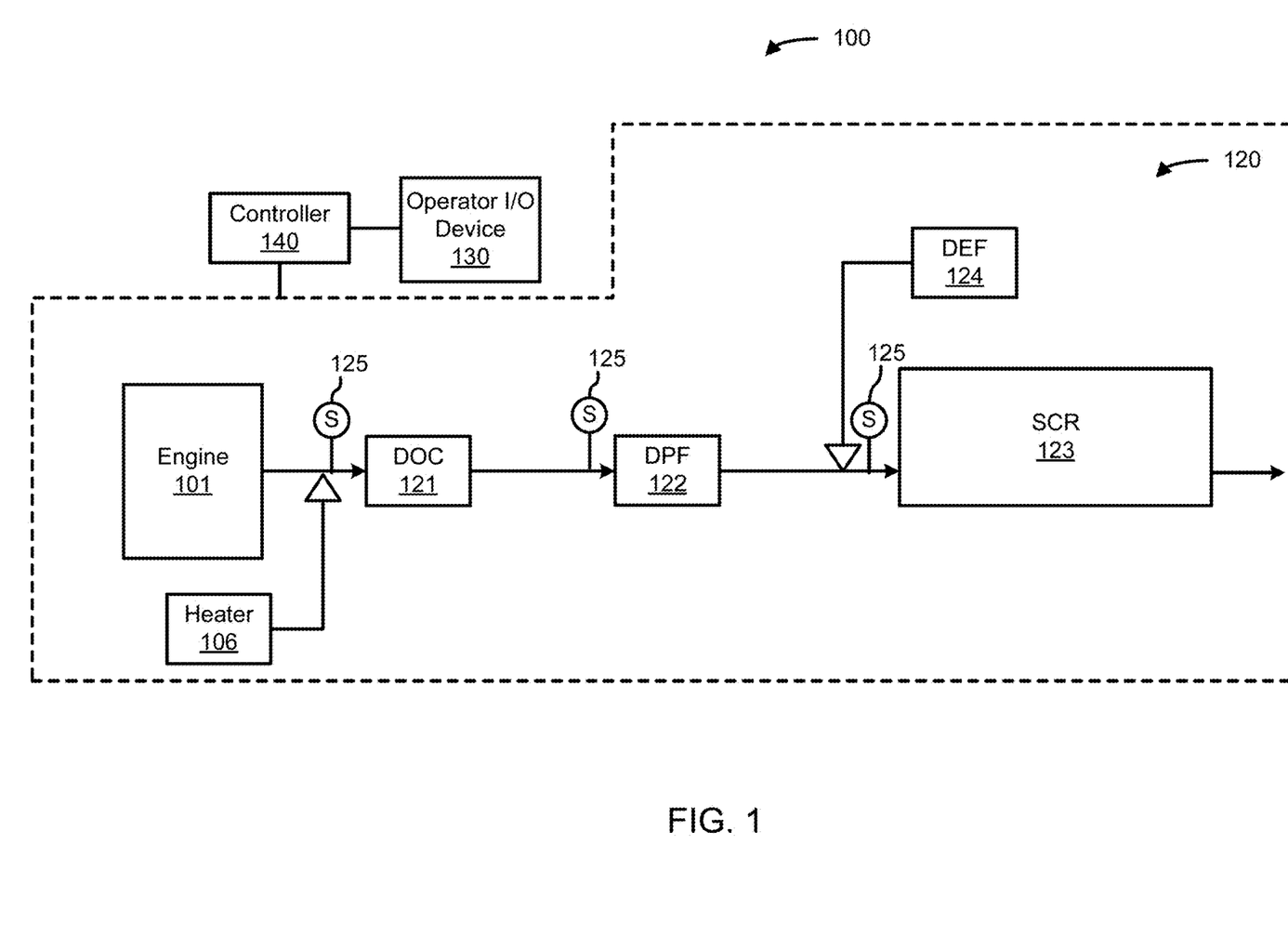
FIG. 1 is a schematic view of a block diagram of a vehicle system, according to an example embodiment.

Referring now to FIG. 1, a system 100 is shown, according to an example embodiment. The system 100 includes an engine 101, an aftertreatment system 120 coupled to the engine 101, an operator input/output (I/O) device 130, and a controller 140, where the controller 140 is coupled and particularly, communicably coupled, to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 101 may be any type of engine that generates exhaust gas, such as a gasoline, natural gas, diesel engine, a hybrid engine (e.g., a combination of an internal combustion engine and an electric motor), and/or any other suitable engine. In the example depicted, the engine 101 is a diesel-powered compression-ignition engine. In some embodiments, the engine 101 may include one or more engine actuators. The one or more engine actuators are structured to control at least one of an engine idle speed, one or more air flaps for torque and power control, and/or meter fuel to control combustion. In some embodiments, an estimated exhaust temperature is based on a position of the one or more engine actuators. In some embodiments, the estimated exhaust temperature is an instantaneous temperature of an exhaust gas.

In some embodiments, the system 100 includes a downpipe. The downpipe fluidly couples the engine 101 to the exhaust aftertreatment system 120.

The aftertreatment system 120 is in exhaust-gas receiving communication with the engine 101. The aftertreatment system 120 includes a heater 106, a diesel particulate filter (DPF) 122, a diesel oxidation catalyst (DOC) 121, a selective catalytic reduction (SCR) system 123, and an ammonia slip catalyst (ASC) (not shown). The heater 106 is structured to selectively heat the exhaust gas in the aftertreatment system 120 and/or one or more components in the aftertreatment system 120. In the embodiment shown in FIG. 1, the heater is coupled to the aftertreatment system 120 downstream of the engine 101 and upstream of the SCR 123. In other embodiments, the aftertreatment system 120 may include additional heaters and/or the heater 106 may be disposed or positioned at a different location of the aftertreatment system 120.

The DOC 121 is structured to receive the exhaust gas from the engine 110 and to oxidize hydrocarbons and carbon monoxide in the exhaust gas. The DPF 122 is arranged or positioned downstream of the DOC 121 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some implementations, the DPF 122 or other components may be omitted. Additionally, although a particular arrangement is shown for the aftertreatment system 120 in FIG. 1, the arrangement of components within the aftertreatment system 120 may be different in other embodiments (e.g., the DPF 122 positioned downstream of the SCR 123 and ASC, one or more components omitted or added, etc.).

The aftertreatment system 120 may further include a reductant delivery system, including a diesel exhaust fluid (DEF) doser 124 and a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR 123 generally (or in particular, the SCR catalyst) by the DEF doser 124 such that the SCR catalyst receives a mixture of the reductant and exhaust gas. The reductant droplets then undergo the processes of evaporation, thermolysis, and hydrolysis to form gaseous ammonia within the decomposition chamber, the SCR catalyst, and/or the exhaust gas conduit system, which leaves the aftertreatment system 120. The aftertreatment system 120 may further include an oxidation catalyst (e.g., the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the conversion efficiency of the DOC 121 exceeds a predefined threshold (e.g., the conversion of HC to less harmful compounds, which is known as the HC conversion efficiency).

The SCR 123 is configured to assist in the reduction of NOx emissions by accelerating a NOx reduction process between the ammonia and the NOx of the exhaust gas into diatomic nitrogen and water. If the SCR catalyst is not at or above a certain temperature, the acceleration of the NOx reduction process is limited, and the SCR 123 may not be operating at a level of efficiency to meet regulations. In some embodiments, this certain temperature is approximately 200-600° C. The SCR catalyst may be made from a combination of an inactive material and an active catalyst, such that the inactive material (e.g., ceramic substrate) directs the exhaust gas towards the active catalyst, which is any sort of material suitable for catalytic reduction (e.g., metal exchanged zeolite (Fe or Cu/zeolite), base metals oxides like vanadium, molybdenum, tungsten, etc.).

When ammonia in the exhaust gas does not react with the SCR catalyst (either because the SCR 123 is below operating temperature or because the amount of dosed ammonia greatly exceeds the amount of NOx), the unreacted ammonia may bind to the SCR catalyst, becoming stored in the SCR 123. This stored ammonia is released from the SCR 123 as the SCR 123 warms, which can cause issues if the amount of ammonia released is greater than the amount of NOx passing through (i.e., more ammonia than needed for the amount of NOx, which can lead to ammonia slip). In some embodiments, the ASC is included and structured to address ammonia slip by removing at least some excess ammonia from the treated exhaust gas before the treated exhaust is released into the atmosphere. As exhaust gas passes through the ASC, some of unreacted ammonia (i.e., unreacted with NOx) remaining in the exhaust gas is partially oxidized to NOx, which then consequently reacts with the remaining unreacted ammonia to form N2 gas and water. However, similar to the SCR catalyst, if the ASC is not at or above a certain temperature, the acceleration of the NH3 oxidization process is limited and the ASC may not be operating at a level of efficiency to meet regulations or desired parameters. In some embodiments, this certain temperature is approximately 250-300° C.

As shown, a plurality of sensors 125 are included in the aftertreatment system 120. The number, placement, and type of sensors included in the aftertreatment system 120 is shown for example purposes only. That is, in other configurations, the number, placement, and type of sensors may differ. The sensors 125 may be NOx sensors, temperature sensors, particulate matter (PM) sensors, flow rate sensors, other emissions constituents sensors, pressure sensors, some combination thereof, and so on. The PM sensors are structured to acquire data indicative of a PM value (e.g., amount, concentration, etc.) at each location that the PM sensor is located (e.g., a concentration amount, such as parts per million). The temperature sensors are structured to acquire data indicative of a temperature at their locations. The PM sensors are structured to monitor particulate matter (e.g., amount, concentration, etc.) flowing through the aftertreatment system 120.

The sensors 125 may be located in or proximate the engine 101, after the engine 101 and before the aftertreatment system 120, after the aftertreatment system 120, in the aftertreatment system like as shown (e.g., coupled to the DPF and/or DOC, coupled to the SCR, etc.), upstream and/or with the engine 101, etc. It should be understood that the location of the sensors may vary. In one embodiment, there may be sensors 125 located both before and after the aftertreatment system 120. In one embodiment, at least one of the sensors is structured as exhaust gas constituent sensors (e.g., CO, NOx, PM, SOx, etc. sensors). In another embodiment, at least one of the sensors 125 is structured as non-exhaust gas constituent sensors that are used to estimate exhaust gas emissions (e.g., temperature, flowrate, pressure, etc.). Additional sensors may be also included with the system 100. The sensors may include engine-related sensors (e.g., torque sensors, speed sensors, pressure sensors, flow-rate sensors, temperature sensors, etc.). The sensors may further sensors associated with other components of the vehicle (e.g., speed sensor of a turbo charger, fuel quantity and injection rate sensor, fuel rail pressure sensor, etc.).

The sensors may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor) and is structured to send a signal to the controller 140 indicative of the speed of the engine 101. When structured as a virtual sensor, at least one input may be used by the controller 140 in an algorithm, model, lookup table, etc. to determine or estimate a parameter of the engine (e.g., power output, etc.). Any of the sensors 125 described herein may be real or virtual.

In some embodiments, the aftertreatment system 120 may include a second SCR system. In these embodiments, the aftertreatment system 120 may also include a second DEF doser, a second DPF, a second heater, etc. The second SCR system may be provided upstream or downstream of the (first) SCR 123. The second DEF doser may be provided upstream of the second SCR. In some embodiments, the second SCR and second DEF doser are substantially similar to the SCR 123 and the DEF doser 124.

The controller 140 is communicably coupled to the sensors 125. Accordingly, the controller 140 is structured to receive data from one more of the sensors 125. The received data may be used by the controller 140 to control one more components in the system 100 and/or for estimation and forecasting purposes.

Referring still to FIG. 1, an operator input/output (I/O) device 130 is also shown. The operator I/O device 130 may be coupled to the controller 140, such that information may be exchanged between the controller 140 and the I/O device 130, wherein the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The controller 140 is structured to control, at least partly, the operation of the system 100 and associated sub-systems, such as the engine 101 and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more electronic control units (ECU), such as a microcontroller. The controller 140 may be separate from or included with at least one of a transmission control unit, an exhaust aftertreatment control unit, a powertrain control module, an engine control module, etc.

Figure 2:
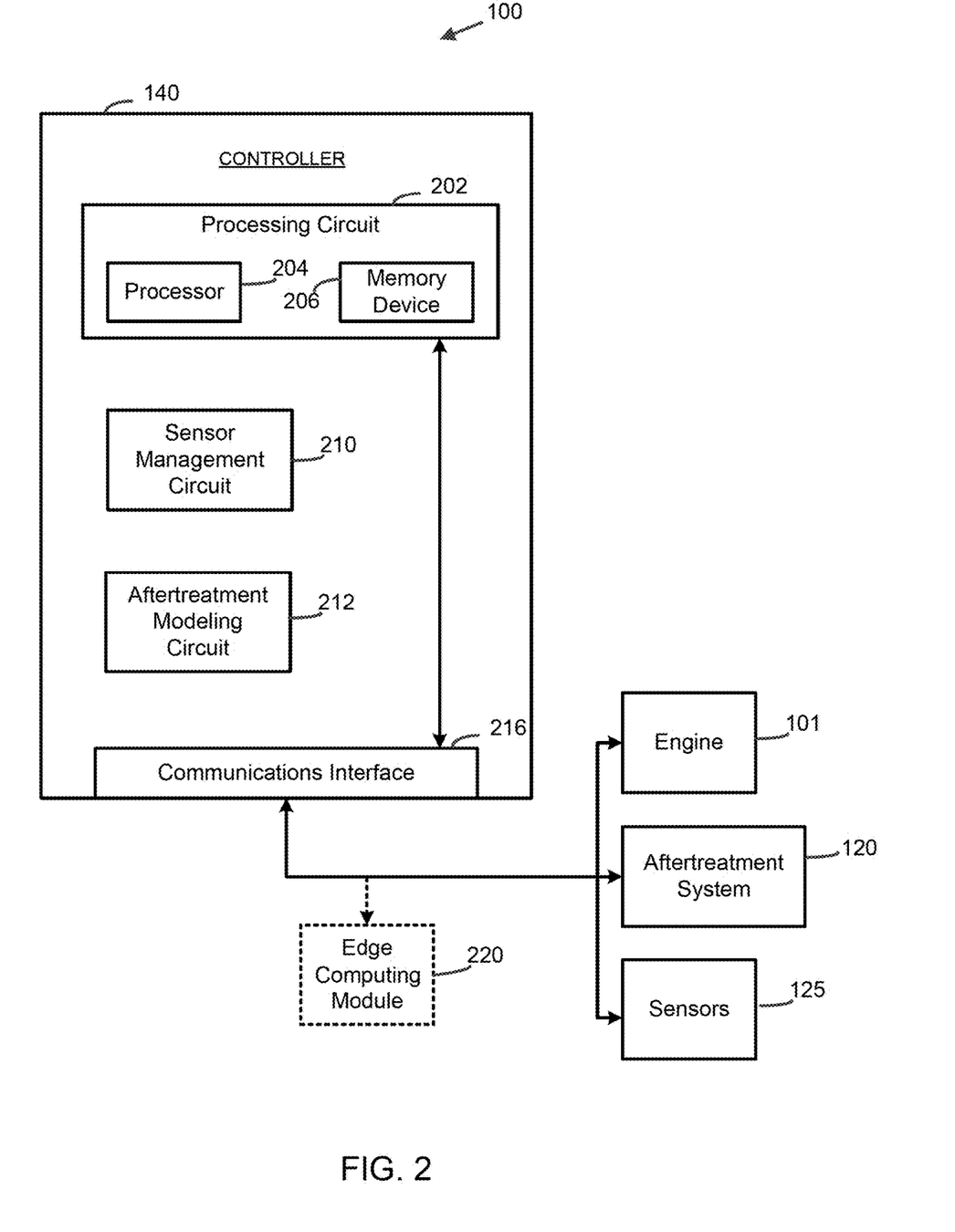
FIG. 2 is a block diagram of the controller of FIG. 1, according to an example embodiment.

Referring now to FIG. 2, schematic diagrams of the controller 140 of the system 100 of FIG. 1 are shown according to various example embodiments. As shown in FIG. 2, the controller 140 includes a processing circuit 202 having a processor 204 and a memory device 206, a sensor management circuit 210, an aftertreatment modeling circuit 212, and a communications interface 216. As described herein, the controller 140 is structured to generate one or more estimated and/or forecasted aftertreatment temperature values.

In one configuration, the sensor management circuit 210 and/or the aftertreatment modeling circuit 212 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be executed on one processor or multiple remote processors. In the latter scenario, the remote processors may be connected to each other through any type of network (e.g., CAN bus, etc.).

In another configuration, the sensor management circuit 210 and/or the aftertreatment modeling circuit 212 are embodied as hardware units, such as electronic control units. As such, the sensor management circuit 210 and/or the aftertreatment modeling circuit 212 may be embodied as one or more circuitry components including, but not limited to, processing circuitry, network interfaces, peripheral devices, input devices, output devices, sensors, etc. In some embodiments, the sensor management circuit 210 and/or the aftertreatment modeling circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor management circuit 210 and/or the aftertreatment modeling circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor management circuit 210 and/or the aftertreatment modeling circuit 212 may also include programmable hardware devices such as field programmable gate arrays, programmable array logic, programmable logic devices or the like. The sensor management circuit 210 and/or the aftertreatment modeling circuit 212 may include one or more memory devices for storing instructions that are executable by the processor(s) of the sensor management circuit 210 and/or the aftertreatment modeling circuit 212. The one or more memory devices and processor(s) may have the same definition as provided below with respect to the memory device 206 and processor 204. In some hardware unit configurations, the sensor management circuit 210 and/or the aftertreatment modeling circuit 212 may be geographically dispersed throughout separate locations in the vehicle. Alternatively, and as shown, the sensor management circuit 210 and/or the aftertreatment modeling circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the sensor management circuit 210 and/or the aftertreatment modeling circuit 212. The depicted configuration represents the sensor management circuit 210 and/or the aftertreatment modeling circuit 212 as machine or computer-readable media storing instructions. However, as mentioned above, this illustration is not meant to be limiting as the present disclosure contemplates other embodiments where the sensor management circuit 210 and/or the aftertreatment modeling circuit 212, or at least one circuit of the sensor management circuit 210 and/or the aftertreatment modeling circuit 212, is configured as a hardware unit. All such combinations and variations are intended to fall within the scope of the present disclosure.

The processor 204 may be implemented as at least one suitable processor, such as a single- or multi-chip processor, a digital signal processor (DSP), an application specific integrated circuit (ASIC), a field programmable gate array (FPGA), or other programmable logic device, discrete gate or transistor logic, discrete hardware components, and/or any combination thereof designed to perform at least some of the functions described herein. A processor may be a processor, a microprocessor, a group of processors, etc. A processor also may be implemented as a combination of computing devices, such as a combination of a DSP and a microprocessor, a plurality of microprocessors, one or more microprocessors in conjunction with a DSP core, or any other such suitable configuration. Thus, the one or more processors may take the form of a single core processor, multi-core processor (e.g., a dual core processor, triple core processor, quad core processor, etc.), and so on. In some embodiments, the one or more processors may be shared by multiple circuits (e.g., the sensor management circuit 210 and/or the aftertreatment modeling circuit 212 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device 206 may be or include tangible, non-transient volatile memory, or non-volatile memory. Accordingly, the memory device 206 may include database components, object code components, script components, or any other type of information structure for supporting the various activities and information structures described herein.

In some embodiments, the processing circuit 202 includes a cache (i.e., a CPU cache, a processor cache, etc.). The cache is a memory bank that bridges the memory device 206 and the processor 204. The cache may include multiple cache levels (i.e., "L1", "L2", and "L3"). In some embodiments, the cache includes as part of the memory device 206 and/or as part of the processor 204. In an example embodiment, the cache is physically integrated with the processor 204 such that a processor core is physically coupled to the cache. The cache may include static random-access memory (SRAM). The cache may enable the processor 204 to communicate with the memory device 206. In some embodiments, the memory 206 includes a flash storage, a random-access memory (RAM) and a multi-level cache (e.g., a processor cache).

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

The sensor management circuit 210 is structured to control the operation of the sensors 125. For example, the sensor management circuit 210 may be structured to generate one or more control signals and transmit the control signals to one or more sensors 125 (e.g., to acquire data, etc.). The control signals may cause the one or more sensors 125 to sense and/or detect the sensor data and/or provide the sensor data to the sensor management circuit 210. In some embodiments, the sensor management circuit 210 may be structured to estimate the sensor data (e.g., when the sensors 125 are virtual sensors). In any of these embodiments the sensor data may include temperature data, flow rate data, pressure data, and/or other data related to the operation of the aftertreatment system 120. The sensor management circuit 210 is also structured to receive the sensor data and provide the sensor data to the other components of the controller 140, such as the aftertreatment modeling circuit 212.

The aftertreatment modeling circuit 212 is structured to generate an estimated and/or predicted value or values regarding the engine system (e.g., the engine 101 and/or the aftertreatment system 120) using one or more models (e.g., statistical models, machine learning models, artificial intelligence, etc.). The estimated and/or predicted values may be generated based on sensor data received from the sensors 125 (e.g., via the sensor management circuit 210), historical data stored by the controller 140 (e.g., stored by the memory device 206), and/or command signals or instructions generated by the controller 140 (e.g., a command or command signal generated to move an engine actuator to a first position). In an example embodiment, the aftertreatment modeling circuit 212 is structured to generate an estimated and/or a predicted temperature value for the aftertreatment system 120. For example, the aftertreatment modeling circuit 212 may analyze the sensor data and historical data using one or more models to determine one or more estimated and/or predicted temperature values for the engine system. The one or more temperature values may include a temperature of a component of the aftertreatment system 120 (e.g., a temperature of the DOC 121, the DPF 122, and/or the SCR 123) and/or a temperature of an exhaust gas flowing out of the engine 101 and through the aftertreatment system 120 at one or more locations (e.g., at a location upstream the aftertreatment system 120, within the aftertreatment system 120, or downstream the aftertreatment system 120).

In some embodiments, the aftertreatment modeling circuit 212 may receive data indicative of an engine operating condition, such as an engine actuator position (e.g., a current actuator position and/or a previous actuator position). The engine operating condition may be a determined engine operating condition (e.g., determined by a virtual sensor 125). For example, the controller 140 may determine the engine actuator position based on a control signal generated by the controller 140 to move an engine actuator to a first position.

In some embodiments, the engine operating condition may be a sensed engine operating condition (e.g., sensed by a real sensor 125). For example, a sensor 125 may detect an engine exhaust temperature. The engine operating condition may also include an engine load (e.g., a measure of the force that acts against the power an engine produces), an engine speed (in revolutions-per-minute), an engine torque, etc. The aftertreatment modeling circuit 212 may determine, based on the received data, one or more temperature values for the engine system. For example, the aftertreatment modeling circuit 212 may analyze the received data by using one or more models to estimate and/or forecast the one or more temperature values. The method of generating the one or more temperature values is described in greater detail herein with respect to FIG. 3.

In some embodiments, the memory 206 stores model data generated by the downpipe model. The controller 140 is structured to dynamically move data, such as data associated with and/or generated by the one or more models (i.e., "model data"), among different memory ranks (e.g., among cache levels), a random-access memory (RAM), and a non-volatile memory device (e.g., flash memory) of the memory device 206. For example, data may be dynamically moved among/between "less accessible" memory devices and "more accessible memory devices." Here, "more accessible" and "less accessible" are used to mean a relative accessibility of data stored by a memory device, such as the memory device 206, by a processor, such as the processor 204. More specifically, "more accessible" refers to a memory device that is physically closer and/or faster than a "less accessible" memory device. For example, a lower-level cache (e.g., "L1" cache) is more accessible than a higher level cache (e.g., "L2" or "L3" cache), a high level cache is more accessible than a DRAM device, and a DRAM device is more accessible than a flash storage device. That is, a lower memory level is more accessible, and a higher memory level is less accessible. In some embodiments, the controller 140 may dynamically transfer one or more portions of the model data based on a vehicle operating parameter. In an example embodiment, the controller 140 may determine that a first portion of the model data is relevant model data based on determining the first portion of the model data corresponds to a current engine operating condition. The controller 140 may automatically transfer the relevant portion of the model data (e.g., the first portion of the model data that corresponds to the current engine operating condition) to a memory device that is more accessible by a processor of the controller.

In some embodiments, the controller 140 may determine, based on the engine operational data, that a first portion of the model data satisfies a predefined relevance standard. The controller 140 may determine whether a relevant portion of the model data (e.g., a portion of the model data that satisfies the predefined relevance standard) is "accessible" or "inaccessible." Here, "inaccessible" and similar terms are used to mean data that is less accessible than data that is stored by a DRAM device. Similarly, "accessible" and similar terms are used to mean data that is at least as accessible as data stored in a DRAM device (e.g., data accessible at a DRAM device or data that is more accessible than data stored in a DRAM device).

In some embodiments, the controller 140 may determine that the relevant portion of the model data is inaccessible by the one or more processors 204. For example, the controller 140 may determine that the relevant portion of the model data is inaccessible by the one or more processors 204 responsive to determining that the relevant portion of the model data is stored in a flash memory device. In some embodiments, the controller 140 may determine that the relevant portion of the model data is accessible by the one or more processors based on the relevant portion of the model data being stored in the RAM or in the multi-level cache.

In some embodiments, the controller 140 may determine that at least a second portion of the model data is irrelevant based on determining that the second portion of the model data does not correspond to the current engine operating condition. For example, the second portion of the model data may correspond to an engine operating condition that is different from the current engine operating condition. As a specific example, the first portion of the model data may correspond to a first engine operating condition (e.g., a first engine speed, a first engine load, a first engine torque, etc.), and the second portion of the model data may correspond to a second engine operating condition that is different from the first engine operating condition (e.g., a second engine speed, a second engine load, a second engine torque). When the engine is operating at the first engine operating condition, the controller 140 may determine that the engine 101 the first portion of the model data is relevant (e.g., satisfies a predefined relevance standard) and that the second portion of the model data is irrelevant (e.g., satisfies a predefined irrelevance standard). The controller 140 may automatically transfer the irrelevant portion of the model data (e.g., the second portion of the model data that does not correspond to the current engine operating condition) to a memory device that is less accessible by a processor.

In some embodiments, the aftertreatment modeling circuit 212 may be embodied as an edge computing device shown as an edge computing module 220. As shown in FIG. 2, in some embodiments, the edge computing module 220 may be separate from the controller 140. For example, the controller 140 may be communicatively coupled (e.g., via the communications interface 216) to the edge computing module 220. In other embodiments, the edge computing module 220 may be integrated with the controller 140. In any of the above-described embodiments, the edge computing module 220 may include a processing circuit similar to the processing circuit 202 described herein. In some embodiments, the edge computing module 220 is configured to execute artificial intelligence (AI) and/or machine learning (ML) models. As described herein, the model data may be determined using AI and/or ML models. The edge computing module 220 is configured to run the AI and/or ML models such that the edge computing module 220 outputs the model data.

Figure 3:
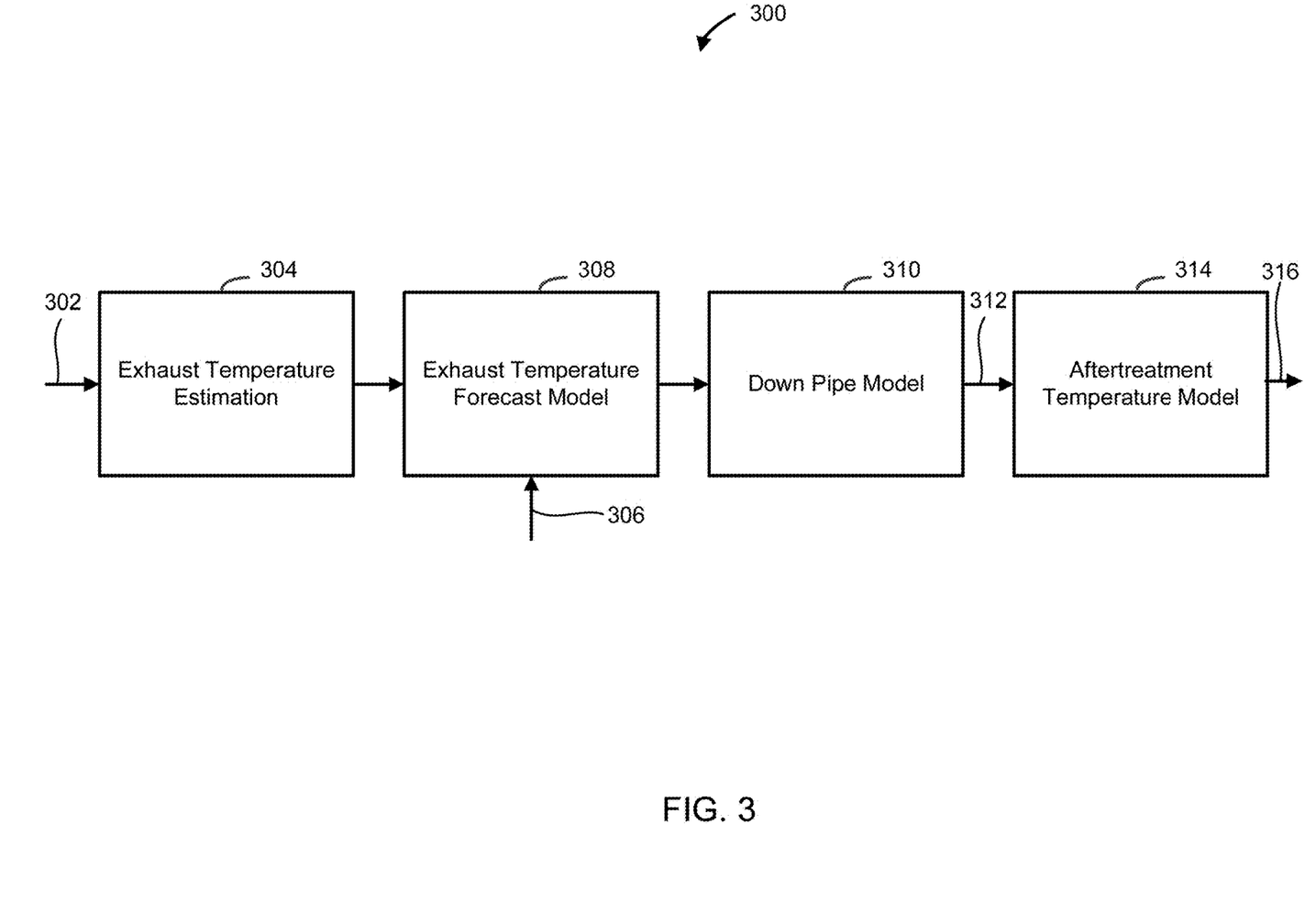
FIG. 3 is a flow diagram of a method of estimating and forecasting a temperature value for the exhaust aftertreatment system of FIG. 1, according to an example embodiment.

FIG. 3 is a flow diagram of a method 300 of estimating and/or forecasting a temperature value for a system, according to an example embodiment. In some embodiments, the controller 140 and/or one or more components thereof, such as the aftertreatment modeling circuit 212, is/are configured to perform method 300. For example, the controller 140 may be structured to perform the method 300, alone or in combination with other devices such as the sensors 125 and/or other components of the system 100. Additionally, and/or alternatively, the method 300 may be performed by the edge computing module 220. For example, the edge computing module 220 may supplement the controller 140 to perform the method 300. In the embodiment shown in FIG. 3, the method 300 is performed by the controller 140.

As an overview of method 300, at process 304, the controller 140 determines an estimated exhaust temperature based on the data 302. At process 308, the controller 140 generates an exhaust temperature forecast for a finite time horizon 306. At process 310, the controller 140 uses a model, and particularly a down pipe model, to correct or modify the exhaust temperature forecast, and outputs a catalyst inlet temperature and, namely, a DOC inlet temperature profile 312. At process 314, the controller 140 uses the DOC inlet temperature profile 312 to generate a catalyst temperature profile 316 (e.g., a second temperature profile, a second inlet temperature profile, a SCR temperature profile, a SCR inlet temperature profile) using an aftertreatment temperature model. In some embodiments, the processes of the method 300 may be performed in a different order than as shown in FIG. 3. In some embodiments, the method 300 may include more or fewer processes than as shown in FIG. 3. In some embodiments the processes of the method 300 may be performed concurrently, partially concurrently, or sequentially.

Referring to the method 300 in more detail, at process 304, the controller 140 determines an estimated exhaust temperature based on the data 302. In some embodiments, the data 302 may include an engine operating condition, such as a position of at least one engine actuator. In additional and/or alternative embodiments, the data 302 may include other engine operating conditions (e.g., an engine load, an engine torque, an engine speed, etc.). In yet other embodiments, the data 302 may include additionally or alternatively data regarding other aspects the system 100 (e.g., data received from the sensors 125). As described above, the sensor data may include data measured by actual sensors and/or data estimated by virtual sensors. For example, the sensor data may include a temperature value for the engine 101 (e.g., a block temperature), a pressure of the exhaust gas at an outlet of the engine 101, a temperature value for the exhaust gas at the outlet of the engine 101, etc. In some embodiments, when the data 302 does not include the engine actuator position, the controller 140 may determine the engine actuator position based on the received data (e.g., the engine load, an engine torque, an engine speed, the temperature value for the engine 101, the pressure of the exhaust gas at an outlet of the engine 101, the temperature value for the exhaust gas at the outlet of the engine 101, etc.). For example, the controller 140 may use a lookup table that correlates the received data with an engine actuator position to determine the engine actuator position.

At process 304, the controller 140 generates an estimated temperature value for an engine exhaust gas. The estimated temperature value for the engine exhaust gas may be based on current and previous actuator positioning and/or physical or virtual sensor measurements from the sensors 125 on or proximal the engine 101. As briefly described above, the one or more engine actuators of the engine 101 are structured to control at least one of an engine idle speed, one or more air flaps for torque and power control, and/or meter fuel to control combustion (i.e., a solenoid for a fuel injector). The estimated temperature value for the exhaust gas may be a current estimated temperature value for the engine exhaust gas (e.g., an estimation of an instantaneous temperature of the engine exhaust gas) or a previous estimated temperature value for the engine exhaust gas.

In some embodiments, the estimated temperature value for the engine exhaust gas may be for the engine exhaust gas at an exhaust outlet of the engine 101, at an inlet of the aftertreatment system 120, or therebetween. Different approaches may be used to estimate exhaust gas temperature. For example, the controller 140 may use a lookup table, a statistical model, a machine learning model, or a combination thereof. In an example embodiment, the controller 140 uses a machine learning model to determine the estimated temperature value. For example, a nonlinear neural network (NARXnet) may be used for estimating the engine exhaust gas temperature value.

At process 308, the controller 140 generates an exhaust temperature forecast for a finite time horizon 306. The time horizon 306 may include a predetermined finite time horizon for which the exhaust temperature is forecasted. For example, the time horizon 306 may include a finite time horizon between a first value and a second value ahead of a current time (e.g., 100 seconds and 600 seconds ahead of the current time). More specifically, the finite time horizon 306 may be between 100 seconds and 300 seconds (e.g., 200 seconds). In other embodiments, the finite time horizon 306 may be less than 100 seconds or more than 600 seconds. The forecasted temperature values for the exhaust gas may be a forecasted temperature value for the finite time horizon 306 for the engine exhaust gas (e.g., a prediction of an instantaneous temperature of the engine exhaust gas). Furthermore, the forecasted temperature value for the engine exhaust gas may be for the engine exhaust gas at an air outlet of the engine 101, at an inlet of the aftertreatment system 120, or therebetween. In some embodiments, the forecasted exhaust temperature is generated for the duration of the finite time horizon.

The controller 140 may use the estimated temperature values generated at process 304 and the time horizon 306 as inputs to generate the forecasted temperature values for the finite time horizon. Different approaches may be used to forecast temperature values. For example, the controller 140 may use a lookup table, a statistical model, a machine learning model, or a combination thereof. In an example embodiment, the controller 140 uses one or more machine learning models to determine the forecasted temperature values. The type of model used may depend on whether future input signals are known (or could be estimated) or future input signals are unknown. In some embodiments, the controller 140 determines that the future input signal is known responsive to receiving the future input signal. In other embodiments, the controller 140 determines that the future input signal is known responsive to receiving information indicative of a future road condition on a route of the vehicle. The road condition may include at least one of a speed limit, a road grade, a road curvature, and/or a weather condition (e.g., dry, wet, snow, etc.). The future road condition may be a road condition along a route of the vehicle that the vehicle will reach within the time horizon 306. The controller 140 may use a lookup table that correlates the future road condition with a future input signal to determine the future input signal. In some embodiments, the controller 140 may determine that the future input signal is not known if the controller 140 has not received the information indicative of a future road condition. In other embodiments, the controller 140 may determine that the future input signal is not known responsive to receiving an indication that the future road condition is not known or not available. The input signal may be related to an engine input signal, such as an input signal to adjust a position of an engine actuator. For example, the model may include a nonlinear autoregressive exogenous model (NARX) and/or a long short-term memory (LSTM) artificial recurrent neural network architecture. More specifically, when the future inputs are known, the controller 140 may use the NARX model, and when the future inputs are unknown, the controller may use the LSTM model. Thus, when a future input signal regarding an engine input is known, the controller 140 may use a first model (e.g., the NARX model) to estimate the forecasted temperature values for the finite time horizon. When a further input signal regarding an engine input is known, the controller 140 may use a second model (e.g., the LSTM model) to estimate the forecasted temperature values for the finite time horizon.

In some embodiments, the controller 140 may receive at least one of information indicative of a future road condition or an indication that the future road condition is not known. Responsive to receiving the information indicative of the future road condition, the controller 140 may determine that a future input signal regarding an engine input is known and determine the forecasted exhaust temperature based on a first model. Responsive to receiving the indication that the further road condition is not known, the controller 140 may determine that the future input signal regarding the engine input is not known and determine the forecasted exhaust temperature based on a second model different than the first model.

At process 310, the controller 140 uses a model to correct the forecasted exhaust gas temperature value, and outputs a DOC inlet temperature profile 312. In one embodiment, the model used to correct the forecasted exhaust gas temperature value is a downpipe model. The downpipe model is a model (e.g., statistical model, mathematical model, machine learning model, artificial intelligence model, etc.) that is used to account for the heat loss from an outlet of the engine 101 to an inlet of the aftertreatment system 120.

In some embodiments, the controller 140 determines a model for an exhaust gas temperature at a point in the downpipe. The controller 140 may determine a change in exhaust temperature between an outlet of the engine 101 and an inlet of the exhaust aftertreatment system 120 based on the model. The controller 140 may modify the forecasted exhaust temperature is based on the change in exhaust temperature.

Specifically, the controller 140 corrects the exhaust temperature forecast to account for heat loss in a downpipe between an outlet of the engine 101 (e.g., a turbo outlet) and an inlet of the aftertreatment system 120. The controller 140 may use one or more methods for modeling the temperature drop between the outlet of the engine 101 and the inlet of the aftertreatment system 120. For example, an analytical solution may be used to derive a model (e.g., a mathematical model, such as an equation) for the exhaust gas temperature at any point in the downpipe. Additionally, and/or alternatively, an analytical solution may be used to derive a model (e.g., a mathematical model, such as an equation) for the exhaust gas temperature at a particular point, such as at the inlet of the aftertreatment system 120. In any of these embodiments, the analytical solution may be used to predict an amount of heat the exhaust gas loses as the exhaust gas travels through the downpipe. The controller 140 corrects the forecasted exhaust gas temperature value using the predicted amount of heat loss and outputs the DOC inlet temperature profile 312.

At process 314, the controller 140 uses the DOC inlet temperature profile 312 to generate a catalyst temperature profile 316 (e.g., a SCR temperature profile). Different approaches may be used to generate the catalyst temperature profile 316. For example, the controller 140 may use a lookup table, a statistical model, a machine learning model, or a combination thereof. In an example embodiment, the controller 140 uses one or more machine learning models to determine the forecasted temperature values. In particular, the controller 140 uses an aftertreatment temperature model. In some embodiments, the controller 140 may model the heat transfer of the aftertreatment system 120 based on the DOC inlet temperature profile 312. In an example embodiment, the aftertreatment temperature models is a nonlinear autoregressive exogenous model (NARX) and/or a long short-term memory (LSTM) artificial recurrent neural network architecture.

In some embodiments, the catalyst inlet temperature profile is based on a model of the exhaust aftertreatment system. For example, the controller 140 may generate a model of a heat transfer of the exhaust aftertreatment system based on a the DOC inlet temperature profile. The catalyst inlet temperature profile is based on the model of the heat transfer of the exhaust aftertreatment system.

It should be understood that the example machine learning models described herein with respect to FIG. 3 are examples, and other machine learning models may be used by the controller 140. For example, additional and/or alternative machine learning models may be used for any of the processes of the method 300.

Figure 4:
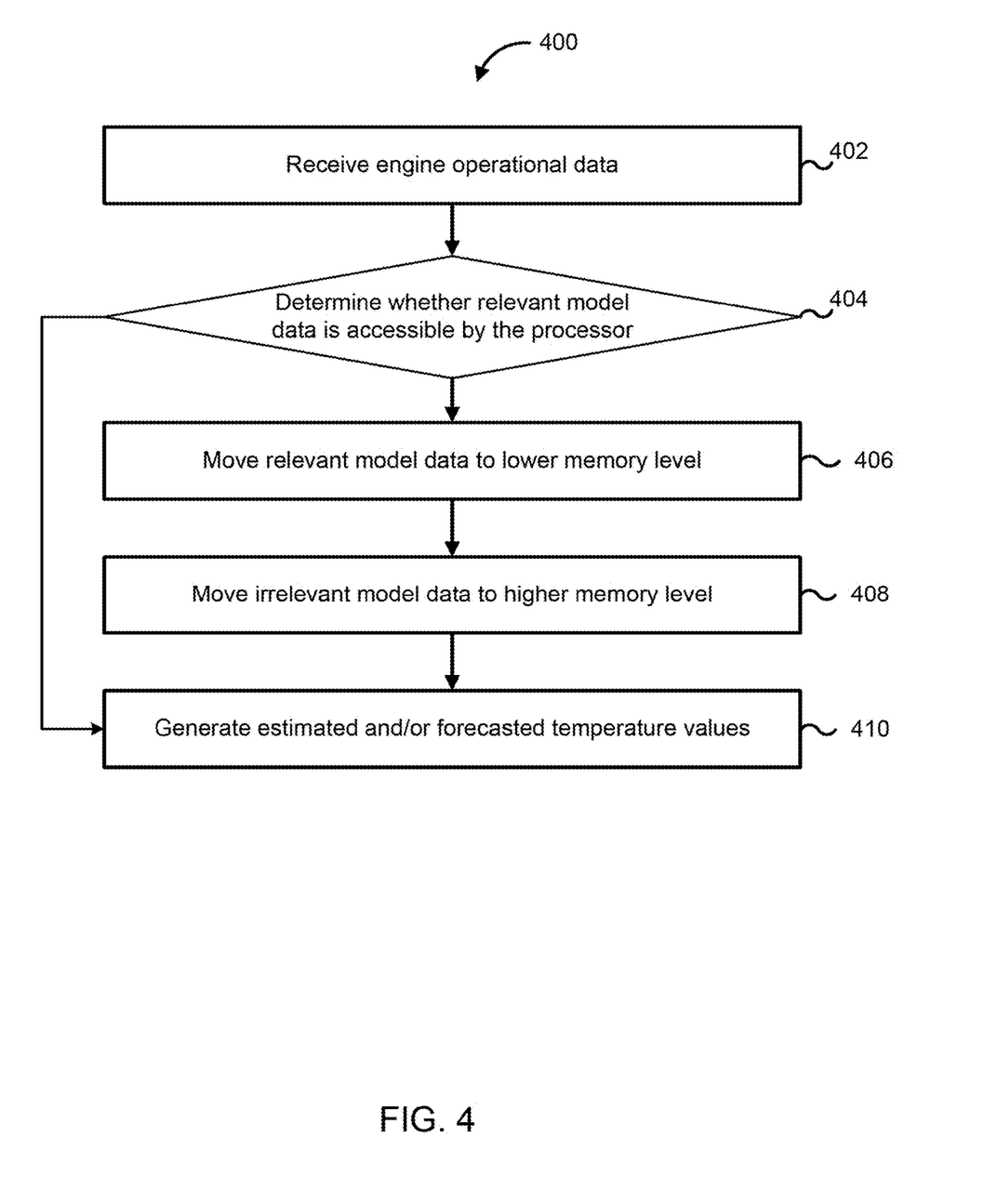
FIG. 4 is a flow diagram of a method of prioritizing memory storage for estimating and forecasting a temperature value for the exhaust aftertreatment system of FIG. 1.

FIG. 4 is a flow diagram of a method 400 of prioritizing memory storage for estimating and forecasting a temperature value for the exhaust aftertreatment system of FIG. 1. In some embodiments, the controller 140 and/or one or more components thereof, such as the aftertreatment modeling circuit 212, is/are configured to perform method 400. For example, the controller 140 and/or one or more components thereof may be structured to perform the method 400, alone or in combination with other devices such as the sensors 125 and/or other components of the system 100. Additionally, and/or alternatively, the method 400 may be performed by the edge computing module 220. For example, the edge computing module 220 may supplement the controller 140 to perform the method 400. The method 400 may include inputs and/or outputs to/from one or more user devices, such as the operator I/O device 130. In the embodiment shown in FIG. 3, the method 400 is performed by the controller 140.

As an overview of method 400, at process 402, the controller 140 receives engine operational data. At process 404, the controller 140 determines whether relevant model data is accessible by the processor 204. At process 406, the controller 140 transfers and/or moves the relevant model data to a lower memory level. At process 408, the controller 140 transfers and/or moves irrelevant model data to a higher memory level. At process 410, the controller 140 generates estimated and/or forecasted temperature values. In some embodiments, the processes of the method 400 may be performed in a different order than as shown in FIG. 4. In some embodiments, the method 400 may include more or fewer processes than as shown in FIG. 4. In some embodiments the processes of the method 400 may be performed concurrently, partially concurrently, or sequentially. For example, processes 406 and 408 may be performed concurrently, partially concurrently, or sequentially, and in a different order than as shown in FIG. 4.

Referring to the method 400 in more detail, at process 402, the controller 140 receives engine operational data. As described above, the engine operational data may include an engine operating condition, such as a position of at least one engine actuator. The at least one engine actuator may be structured to control at least one of an engine idle speed, one or more air flaps for torque and power control, and/or meter fuel to control combustion (among potentially other actuators included with the system). The position of the at least one engine actuator may correspond to an engine speed and/or torque, an air flow rate, a fuel injection amount, a fuel injection pressure, and so on. In additional and/or alternative embodiments, the data input may include other engine operating conditions (e.g., an engine load, an engine speed, etc.).

At process 404, the controller 140 determines whether relevant model data is accessible by the processor 204. The controller 140 may be structured to identify a first portion of the model data that corresponds to a current engine operating condition. As briefly described above, the controller 140 may determine that a first portion of the model data is relevant based on determining the first portion of the model data corresponds to the engine operating condition received with the engine operating data at process 402. In some embodiments, the controller 140 may determine that the first portion of the model data satisfies a relevance standard based on the model data corresponding to an engine operating condition that is the same as or similar to the current engine operating condition. Furthermore, the controller 140 may determine that at least a second portion of the model data is irrelevant based on determining that the second portion of the model data correspond to an engine operating condition that is different from the current engine operating condition.

In some embodiments, the controller 140 may determine that the second portion of the model data satisfies an irrelevance standard based on the model data corresponding to an engine operating condition that is different from the current engine operating condition. The relevance standard and the irrelevance standard refer to a threshold amount of relevance of the portion of the model data. More specifically, the controller 140 may determine a relevance score for the portion of the model data and compare the relevance score to the irrelevance standard. The relevance score may be determined based on a comparison between the engine operating conditions of the portion of the model data and the current engine operating conditions of the engine 101. More specifically, the controller 140 may determine the relevance score based on a difference (e.g., absolute difference, percent difference, etc.) between a current engine operating condition value (e.g., a current engine speed value, a current engine load value, a current engine torque value, etc.) and a model data engine operating condition value (e.g., a model data engine speed value, a model data engine load value, a model data engine torque value, etc.). If the relevance score satisfies the relevance standard (e.g., the difference between the model engine operating condition and the current engine operating condition is low), the controller 140 may determine that a first portion of the model data is relevant. If the relevance score satisfies the irrelevance standard (e.g., the difference between the model engine operating condition and the current engine operating condition is high), the controller 140 may determine that a first portion of the model data is irrelevant.

Finally, the controller 140 may determine whether the relevant model data (e.g., the first portion of the model data) is accessible by the processor 204. For example, the controller may determine that the relevant model data is accessible by the processor 204 based on determining that the model data is stored in the CPU cache or in RAM, and that the relevant model data is not accessible by the processor 204 based on determining that the model data is not stored in the CPU cache or in RAM.

At process 406, the controller 140 may move, shift, or otherwise transfer the relevant model data to a lower memory level. For example, the controller 140 may move the relevant model data from flash memory to DRAM, from DRAM to SRAM (e.g., the CPU cache), and/or from a high-level cache to a lower level cache (e.g., moving the data from L3 cache to L1 cache). At process 408, the controller 140 may move the irrelevant model data to a higher memory level. For example, the controller 140 may move the irrelevant model data from a lower-level cache to a higher level cache, from SRAM to DRAM, and/or from DRAM to flash memory.

At process 410, the controller 140 generates estimated and/or forecasted temperature values. The estimated and/or forecasted temperature values may be generated using a model, and, in particular, using the relevant portion of the model data, in some embodiments. The method of generating estimated and/or forecasted temperature is described herein, with respect to FIG. 3.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent, or fixed) or moveable (e.g., removable, or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the sensor management circuit 210 and/or the aftertreatment modeling circuit 212 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices.

While the term "processor" is briefly defined above, the term "processor" and "processing circuit" are meant to be broadly interpreted. In some embodiments, the one or more processors may be external to the apparatus (e.g., on-board vehicle controller), for example the one or more processors may be or included with a remote processor (e.g., a cloud-based processor). In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object-oriented programming language such as Java, Smalltalk, C++ or the like and conventional procedural programming languages, such as the "C" programming language or similar programming languages. The computer readable program code may execute entirely on a local computer, partly on the local computer, as a stand-alone computer-readable package, partly on the local computer and partly on a remote computer, etc. In the latter scenario, the remote computer may be connected to the local computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system, comprising:
    a processing circuit comprising at least one memory coupled to one or more processors, the at least one memory storing instructions therein that, when executed by the one or more processors, cause the one or more processors to:
    receive an estimated exhaust temperature;
    generate, based on the estimated exhaust temperature, a forecasted exhaust temperature;
    modify the forecasted exhaust temperature based on a downpipe model to generate a first temperature profile corresponding to a first component of an exhaust aftertreatment system; and
    generate, based on the first temperature profile, a second temperature profile corresponding to a second component of the exhaust aftertreatment system, the second component different from the first component.

2. The system of claim 1, wherein the at least one memory stores model data generated by the downpipe model, and wherein the instructions, when executed by the one or more processors, further cause the one or more processors to:
    determine that a first portion of the model data satisfies a predefined relevance standard;
    determine that the first portion of the model data that satisfies the predefined relevance standard is inaccessible by the one or more processors; and
    cause the at least one memory to move the first portion of the model data to a different position within the at least one memory.

3. The system of claim 1, wherein the second component is positioned downstream of the first component in the exhaust aftertreatment system.

4. The system of claim 1, further comprising an engine, wherein the estimated exhaust temperature is based on at least one operating condition of the engine, and wherein the processing circuit is coupled to the engine.

5. The system of claim 4, wherein the engine comprises one or more engine actuators structured to control an engine idle speed, wherein the at least one operating condition of the engine is a position of the one or more engine actuators, and wherein the estimated exhaust temperature is an instantaneous temperature of an exhaust gas emitted from the engine.

6. The system of claim 1, wherein the instructions, when executed by the one or more processors, further cause the one or more processors to:
    receive at least one of:
        information indicative of a future road condition; or
        an indication that the future road condition is not known;
    responsive to receiving the information indicative of the future road condition, determine the forecasted exhaust temperature based on a first model; and
    responsive to receiving the indication that the future road condition is not known, determine the forecasted exhaust temperature based on a second model different than the first model.

7. The system of claim 6, wherein the instructions, when executed by the one or more processors, further cause the one or more processors to:
    determine a model for an exhaust gas temperature at a point in a downpipe fluidly coupling an engine to the exhaust aftertreatment system; and
    determine a change in exhaust temperature between an outlet of the engine and an inlet of the exhaust aftertreatment system based on the model;
    wherein modifying the forecasted exhaust temperature is based on the change in exhaust temperature.

8. The system of claim 1, further comprising:
    an oxidation catalyst, wherein the first temperature profile corresponds to the oxidation catalyst; and
    a selective catalytic reduction catalyst positioned downstream of the oxidation catalyst, wherein the second temperature profile corresponds to the selective catalytic reduction catalyst.

9. The system of claim 1, wherein the instructions, when executed by the one or more processors, further cause the one or more processors to:
    generate a model of a heat transfer of the exhaust aftertreatment system based on the first temperature profile;
    wherein the second temperature profile is based on the model of the heat transfer of the exhaust aftertreatment system.

10. A method comprising:
    receiving an estimated exhaust gas temperature corresponding to exhaust gas emitted from an engine;
    generating, based on the estimated gas exhaust temperature, a forecasted exhaust temperature;
    generating a first temperature profile corresponding to a first aftertreatment system component of an exhaust aftertreatment system based on the forecasted exhaust temperature; and
    generating, based on the first temperature profile, a second temperature profile corresponding to a second aftertreatment system component of the exhaust aftertreatment system, the second aftertreatment system component different from the first aftertreatment system component.

11. The method of claim 10, wherein the forecasted exhaust temperature is generated for a duration of a time horizon.

12. The method of claim 10, wherein the first aftertreatment system component is an oxidation catalyst.

13. The method of claim 10, wherein the second aftertreatment system component is a selective catalytic reduction (SCR) system.

14. The method of claim 10, further comprising:
receiving at least one of:
- information indicative of a future road condition; or
- an indication that the future road condition is not known;

responsive to receiving the information indicative of the future road condition, determining that the forecasted exhaust temperature based on a first model; and responsive to receiving the indication that the future road condition is not known, determining that the forecasted exhaust temperature based on a second model different than the first model.

15. The method of claim 10, further comprising:
determining a model for an exhaust gas temperature at a point in a downpipe that fluidly couples the engine to the exhaust aftertreatment system; and determining a change in exhaust temperature between an outlet of the engine and an inlet of the exhaust aftertreatment system based on the model, wherein generating the forecasted exhaust temperature is based on the change in exhaust temperature.

16. The method of claim 10, further comprising:
storing, by a memory of a controller, model data;
determining that a first portion of the model data satisfies a predefined relevance standard;
determining that the first portion of the model data that satisfies the predefined relevance standard is inaccessible by a processor of the controller; and
moving the first portion of the model data to a lower memory level of the memory of the controller.

17. A non-transitory computer-readable medium storing instructions therein that, when executed by at least one processor of a controller, cause the controller to perform operations comprising:
receiving engine operational data comprising a first engine operating condition;
determining that a first portion of model data of a model is not accessible by the at least one processor of a memory based on determining that the first portion of the model data is stored at a first memory level of the memory;
moving the first portion of the model data to a second memory level of the memory, the second memory level different than the first memory level; and
generating at least one of an estimated temperature value or a forecasted temperature value based on the model and using the first portion of the model data.

18. The non-transitory computer readable medium of claim 17, wherein the instructions, when executed by the at least one processor, cause the controller to perform further operations comprising:
determining a first relevance value for the first portion of the model data based on comparing the first portion of the model data with the first engine operating condition; and
determining that the first portion of the model data is a relevant portion of the model data based on the first relevance value satisfying a relevance standard.

19. The non-transitory computer readable medium of claim 18, wherein the instructions, when executed by the at least one processor, cause the controller to perform further operations comprising:
determining a second relevance value for a second portion of the model data based on comparing the second portion of the model data with the first engine operating condition;
determining that the second portion of the model data is an irrelevant portion of the model data based on the second relevance value satisfying the relevance standard; and
causing the memory to move the second portion of the model data to a third memory level of the memory, higher than the second memory level.

20. The non-transitory computer readable medium of claim 17, wherein the instructions, when executed by the at least one processor, cause the controller to perform further operations comprising:
determining that the first portion of the model data is accessible by the controller based on the first portion of the model data being stored at the second memory level or a third memory level of the memory, lower than the second memory level.

* * * * *